US010506486B2

(12) United States Patent
Gotou et al.

(10) Patent No.: US 10,506,486 B2
(45) Date of Patent: *Dec. 10, 2019

(54) WIRELESS TERMINAL AND METHOD OF OPERATING

(71) Applicant: NEC CORPORATION, Tokyo (JP)

(72) Inventors: Kouhei Gotou, Tokyo (JP); Yannick Lair, Berkshire (GB); Iskren Ianev, Berkshire (GB)

(73) Assignee: NEC CORPORATION, Minato-ku, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/902,365

(22) Filed: Feb. 22, 2018

(65) Prior Publication Data
US 2018/0184347 A1    Jun. 28, 2018

Related U.S. Application Data

(63) Continuation of application No. 14/390,933, filed as application No. PCT/JP2013/058466 on Mar. 15, 2013, now Pat. No. 9,924,429.

(30) Foreign Application Priority Data

Apr. 18, 2012   (GB) .................................. 1206790.6

(51) Int. Cl.
*H04W 36/14*   (2009.01)
*H04W 60/00*   (2009.01)
(Continued)

(52) U.S. Cl.
CPC ........... *H04W 36/14* (2013.01); *H04W 60/00* (2013.01); *H04W 48/18* (2013.01); *H04W 60/04* (2013.01); *H04W 88/06* (2013.01)

(58) Field of Classification Search
None
See application file for complete search history.

(56) References Cited

U.S. PATENT DOCUMENTS

2002/0089942 A1   7/2002   Seppa et al.
2005/0119008 A1   6/2005   Haumont
(Continued)

FOREIGN PATENT DOCUMENTS

CN   101730129 A   6/2010
CN   101932035 A   12/2010
(Continued)

OTHER PUBLICATIONS

Communication dated Jul. 13, 2017, from the State Intellectual Property Office of the P.R.C., in counterpart Chinese application No. 201380020598.4.
(Continued)

*Primary Examiner* — Duc T Duong
(74) *Attorney, Agent, or Firm* — Sughrue Mion, PLLC

(57) ABSTRACT

A wireless terminal can communicate with a first network of first type and a second network of second different type. The wireless terminal performs a packet-domain attachment to the first network and initiates a ready timer indicating that the wireless terminal is in an attached state and has recently sent data to the first network. The wireless terminal initiates an inter-system change from the first network to the second network whereby the wireless terminal becomes registered to the second network. Advantageously the wireless terminal has means for rendering the ready timer ineffective when the inter-system change is performed. The network apparatus has means for initiating its own ready timer dependent on the attachment occurring, this ready timer also indicating that the wireless terminal is in an attached state and has recently sent data to the first network.

9 Claims, 7 Drawing Sheets

(51) Int. Cl.
*H04W 88/06* (2009.01)
*H04W 48/18* (2009.01)
*H04W 60/04* (2009.01)

(56) References Cited

U.S. PATENT DOCUMENTS

| | | | |
|---|---|---|---|
| 2009/0219902 | A1 | 9/2009 | Aoyama |
| 2010/0074170 | A1 | 3/2010 | Chen |
| 2010/0190499 | A1 | 7/2010 | Wu |
| 2011/0090848 | A1 | 4/2011 | Kim et al. |
| 2011/0177817 | A1 | 7/2011 | Hole |
| 2011/0275371 | A1 | 11/2011 | Roger |
| 2012/0002545 | A1 | 1/2012 | Watfa et al. |
| 2012/0039313 | A1* | 2/2012 | Jain ................. H04B 17/318 370/338 |
| 2012/0270547 | A1* | 10/2012 | Long ................. H04W 60/02 455/435.1 |
| 2013/0016607 | A1* | 1/2013 | Tiwari ................. H04W 28/02 370/230 |
| 2013/0039244 | A1 | 2/2013 | Sun |
| 2013/0223312 | A1 | 8/2013 | Ai |
| 2013/0272120 | A1* | 10/2013 | Ai ................. H04W 28/0289 370/230 |
| 2013/0316693 | A1* | 11/2013 | Ito ................. G04R 20/18 455/418 |
| 2015/0056993 | A1* | 2/2015 | Zhu ................. H04W 60/04 455/435.1 |
| 2015/0092665 | A1* | 4/2015 | Choi ................. H04W 36/08 370/328 |
| 2017/0245188 | A1* | 8/2017 | Kim ................. H04W 24/04 |

FOREIGN PATENT DOCUMENTS

| | | | |
|---|---|---|---|
| CN | 102301795 | A | 12/2011 |
| CN | 102301796 | A | 12/2011 |
| KR | 1020080000868 | A | 1/2008 |
| WO | 2010087469 | A1 | 8/2010 |
| WO | 2011136053 | A1 | 11/2011 |

OTHER PUBLICATIONS

Communication dated Apr. 11, 2017 from the Japanese Patent Office in counterpart Japanese application No. 2014-550965.
Communication dated Dec. 18, 2015, issued by the European Patent Office in corresponding European Application No. 13778745.3.
3GPP, "3rd Generation Partnership Project; Technical Specification Group Services and System Aspects; General Packet Radio Service (GPRS); Service description; Stage 2 (Release 11)", Technical Specification, 3GPP TS 23.060, V11.0.0, Dec. 2011. Cited in the Applicant's Specification.
3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 11)", Technical Specification, 3GPP TS 23.401, V11.0.0, Dec. 2011. Cited in the Applicant's Specification.
3GPP, "3rd Generation Partnership Project; Technical Specification Group GSM/EDGE Radio Access Network; General Packet Radio Service (GPRS); Mobile Station (MS)—Base Station System (BSS) interface; Radio Link Control / Medium Access Control (RLC/MAC) protocol (Release 11)", Technical Specification, 3GPP TS 44.060, V11.0.0, Mar. 2012. Cited in the Applicant's Specification.
3GPP, "3rd Generation Partnership Project; Technical Specification Group Core Network and Terminals; Mobile Radio interface Layer 3 specification; Core network protocols; Stage 3 (Release 9)", Technical Specification, 3GPP TS 24.008, V9.10.0, Mar. 2012. Cited in ISR.
British Search and Examination Report under Sections 17 and 18(3) for GB Application No. 1206790.6, dated Aug. 15, 2012.
International Search Report for PCT Application No. PCT/JP2013/058466, dated May 14, 2014.

* cited by examiner

WIRELESS TERMINAL AND METHOD OF OPERATING

CROSS REFERENCE TO RELATED APPLICATIONS

This application is a continuation of U.S. application Ser. No. 14/390,933 filed Oct. 6, 2014, which is a National Stage of International Application No. PCT/JP2013/058466 filed Mar. 15, 2013, which claims priority from United Kingdom Patent Application No. 1206790.6, filed Apr. 18, 2012, the contents of all of which are incorporated herein by reference.

TECHNICAL FIELD

The invention relates to a wireless terminal and method of operating, and in particular to intersystem change between E-UTRAN (also known as LTE) and GERAN.

BACKGROUND ART

In GPRS (General Packet Radio Service), as described in 3GPP TS 23.060, the UE (User Equipment) can be in three different modes or states:

In GPRS IDLE state, the wireless terminal (mobile station, MS or User Equipment, UE) of a subscriber is not attached to GPRS mobility management (MM) of the network. The wireless terminal and Serving GPRS Support Node (SGSN) contexts hold no valid location or routing information associated with the subscriber.

In STANDBY state, the subscriber is attached to GPRS mobility management. The wireless terminal (UE) and SGSN have established GPRS mobility management (GMM) contexts.

In READY state, the SGSN MM context corresponds to the STANDBY MM context extended by location information associated with the subscriber on the cell level. The wireless terminal (UE) performs mobility management procedures to provide the network with the actual selected cell. GPRS cell selection and re-selection is generally done locally by the wireless terminal (UE), or may optionally be controlled by the network.

Regardless of whether a radio resource is allocated to the subscriber or not, the GMM context remains in the READY state even when there is no data being communicated. A timer (GMM READY timer T3314) supervises the READY state. The GMM READY timer is initiated or started when data is sent by the UE and the wireless terminal goes into the READY state. A GMM context moves from READY state to STANDBY state when the GMM READY timer expires. In order to move from READY state to IDLE state, the wireless terminal (UE) initiates the GPRS Detach procedure. More details can be found in 3GPP TS 23.060, sub-clause 6.1.1. The length (hence duration) of the GMM READY timer can only be changed by the SGSN.

For intersystem change between UTRAN and GERAN, the GMM READY timer T3314 can be kept running due to Cell Change Order (CCO) procedure completion, as described in 3GPP TS 44.060, sub-clause 8.4.1:

"In case of inter-RAT network controlled cell reselection, the mobile station shall regard the network controlled cell re-selection as successfully completed according to specifications of the target RAT, or when the GMM READY timer (see 3GPP TS 24.008) stops running during the execution of the procedure. The mobile station shall then stop timer T3174."

It should be noted that 3GPP TS 23.060, sub-clause 6.13.1.1, which describes Iu mode to A/Gb mode Intra SGSN Change, only requires that the UE checks the PMM state in UTRAN to decide which procedure to trigger after intersystem change from UTRAN to GERAN, i.e. there is no checking of the Ready timer due to an intersystem change from UTRAN to GERAN beyond the case of the CCO procedure completion as highlighted above.

Evolved UTRAN (E-UTRAN) specifies an Idle mode Signalling Reduction (ISR) function which provides a mechanism to limit or reduce signalling in idle mode during any inter-RAT cell-reselection between E-UTRAN and UTRAN/GERAN. By keeping a context for a wireless terminal (User Equipment, UE) in both the MME and the SGSN, the UE does not need to perform NAS registration procedure (Routing Area Update, RAU) when moving between E-UTRAN and GERAN/UTRAN as long as the UE stays in the registered areas (Routing Area in GERAN/UTRAN, tracking Area List in E-UTRAN).

According to this mechanism the UE in idle mode, when ISR is activated, is registered with both the MME of the E-UTRAN and the SGSN of the UTRAN/GERAN (see 3GPP TS23.401, Annex J1). Both the SGSN and the MME have a control connection with the serving gateway (S-GW).

The UE receives and stores mobility management (MM) parameters provided to the UE by the SGSN (e.g. P-TMSI and RA) and provided to the UE by the MME (e.g. GUTI and TA(s)) and the UE stores session management (bearer) contexts that are common to E-UTRAN and GERAN/UTRAN accesses.

Using these stored parameters and contexts, the UE when it is in idle state can reselect between E-UTRAN and GERAN/UTRAN radio access cells when the UE is within the registered routing areas (RAs) and tracking areas (TAs) without any need to perform any tracking area update (TAU) or routing area update (RAU) procedures by interacting with the network.

CITATION LIST

Non Patent Literature

NPL 1: 3GPP TS 23.060 V11.0.0 (2011-12)
NPL 2: 3GPP TS 23.401 V11.0.0 (2011-12)
NPL 3: 3GPP TS 44.060 V11.0.0 (2012-03)

SUMMARY OF INVENTION

Technical Problem

In existing 3GPP specifications, the handling of the Ready timer is not specifically described for the case of an intersystem change between E-UTRAN and GERAN. However, it has now been realised that two problematic scenarios will occur during idle mode cell reselection, depending on whether or not ISR is activated or not activated. These two scenarios will now be described with reference to FIG. 1, FIG. 2 (for a first scenario) and FIG. 3 (for a second scenario).

FIGS. 1 and 2, are event diagrams according to a first scenario in which ISR is activated when the UE reselects GERAN.

FIG. 1 illustrates current procedure for performing an E-UTRAN-to-GERAN intersystem change while Ready timer is running and ISR is activated when the UE reselects GERAN, where ISR has been previously activated while the UE 102 was in GERAN. In this first case, when a UE 102 with Ready timer running selects E-UTRAN (by the known 're-selection' procedure 110), performs TAU 112, and then goes back to (selects) GERAN (see block 118) with Ready timer still running, the UE will perform a Cell Update procedure 120 once in GERAN even though the UE comes back to the registered RA. This is because the Cell Update is triggered by expiry of the Ready timer, as shown by arrow 122.

FIG. 2 is another event diagram according to the first scenario (ISR having been activated), illustrating current procedure for performing an E-UTRAN-to-GERAN inter-system change while Ready timer is running and ISR is activated when the UE reselects GERAN, where ISR has been previously activated while the UE was in E-UTRAN and not in GERAN. In this second case, following the TAU request 112 from the UE 102, a context request 224 is transmitted by the MME 106 to the SGSN 104, and a context response 226 is transmitted by the SGSN 104 to the MME 106, in response to the context request 224.

It can be seen from FIG. 1 and FIG. 2 that keeping Ready timer running will introduce additional signalling in the form of a cell update 120. However, since ISR is activated when the UE reselects GERAN, the GERAN network does not expect any signalling from the UE at intersystem change, so this extra cell update 120 is unwanted and unnecessary.

FIG. 3 illustrates a second scenario in which ISR is not activated when the UE reselects GERAN. When the UE 102 with Ready timer running (122) selects E-UTRAN (block 110), performs TAU 112, 117. Following the TAU request 112 from the UE 102, a context request 224 is transmitted by the MME 106 to the SGSN 104, and a context response 226 is transmitted by the SGSN 104 to the MME 106, in response to the context request 224. The UE then goes back to GERAN (see block 119). The UE 102 will perform a Routing Area Update procedure 328, 330 when the UE 102 comes back to the registered RA (block 119).

For this second scenario, it can be seen from FIG. 3 that keeping the Ready timer running while the UE is in E-UTRAN serves no useful purpose since the UE will, by default, perform a Routing Area Update procedure 328, 329 once the UE is back in GERAN. Additionally, keeping the Ready timer running is a waste of resources while the UE is in E-UTRAN, for both the UE and the network.

It is clearly desirable to overcome the above-described problems and limitations of the current state of the art.

It is an object of the invention to provide improved operation of the wireless terminal at intersystem change from one type of network to another type of network, in particular from E_UTRAN to UTRAN/GERAN.

Solution to Problem

According to one aspect of the invention, there is provided a wireless terminal for communicating with a first network of first type and for communicating with a second network of second type different than the first type, the wireless terminal comprising: means for performing an attachment to the first network in a packet domain and initiating a ready timer dependent on the performing the attachment, the ready timer indicating that the wireless terminal is in an attached state; means for initiating an inter-system change from the first network to the second network whereby the wireless terminal becomes detached from the first network and attached to the second network in the packet domain; and means for rendering ineffective the ready timer depending on the initiated inter-system change.

According to another aspect of the invention there is provided a method for use in wireless terminal, the wireless terminal being for communicating with a first network of first type and for communicating with a second network of second type different than the first type, the method comprising: performing an attachment to the first network in a packet domain and initiating a ready timer dependent on the performing the attachment, the ready timer indicating that the wireless terminal is in an attached state; initiating an inter-system change from the first network to the second network whereby the terminal becomes detached from the first network and attached to the second network in the packet domain; and rendering ineffective the ready timer depending on the initiated inter-system change.

According to another aspect of the invention there is provided a computer program product for use in wireless terminal for communicating with a first network of first type and for communicating with a second network of second type different than the first type, the computer program product comprising: a processor; and memory coupled to the processor, the memory comprising instructions which when carried out by the processor perform the functions of: performing an attachment to the first network in a packet domain and initiating a ready timer dependent on the performing the attachment, the ready timer indicating that the wireless terminal is in an attached state; initiating an inter-system change from the first network to the second network whereby the terminal becomes detached from the first network and attached to the second network in the packet domain; and rendering ineffective the ready timer depending on the initiated inter-system change.

According to another aspect of the invention there is provided a network apparatus for operating as part of a first network of first type and for communicating with a wireless terminal that can communicate with a second network of second type different than the first type, the network apparatus comprising: means for performing an attachment to the wireless terminal in a packet domain and initiating a ready timer in the network apparatus dependent on the performing the attachment, the ready timer indicating that the wireless terminal is in an attached state; means for, during an inter-system change of the wireless terminal from the first network to the second network, performing a detachment whereby the wireless terminal becomes detached in the packet domain from the first network; and means for rendering ineffective the ready timer depending on the performing a detachment.

According to another aspect of the invention there is provided a method for use in a network apparatus, the network apparatus being for operating as part of a first network of first type and for communicating with a wireless terminal that can communicate with a second network of second type different than the first type, the method comprising: performing an attachment to the wireless terminal in a packet domain and initiating a ready timer in the network apparatus dependent on the performing the attachment, the ready timer indicating that the wireless terminal is in an attached state; during an inter-system change of the wireless terminal from the first network to the second network, performing a detachment whereby the wireless terminal becomes detached in the packet domain from the first network; and rendering ineffective the ready timer depending on the performing a detachment.

According to another aspect of the invention there is provided a computer program product for use in a network apparatus, the network apparatus being for operating as part of a first network of first type and for communicating with a wireless terminal that can communicate with a second network of second type different than the first type, the computer program product comprising: a processor; memory coupled to the processor and comprising instructions which when carried out by the processor perform the functions of: performing an attachment to the wireless terminal in a packet domain and initiating a ready timer in the network apparatus dependent on the performing the attachment, the ready timer indicating that the wireless terminal is in an attached state; during an inter-system change of the wireless terminal from the first network to the second network, performing a detachment whereby the wireless terminal becomes detached in the packet domain from the first network; and rendering ineffective the ready timer depending on the performing a detachment.

Advantageous Effects of Invention

When implemented for use in E-UTRAN and UTRAN/GERAN networks, the inventive features provide the advantage that unnecessary handling of Ready timer is avoided while the UE is in E-UTRAN. Also Cell Update signalling is avoided when the UE re-selects to GERAN when ISR is activated.

DESCRIPTION OF EMBODIMENTS

Embodiments, described herein, provide that: Firstly, the UE ignores Ready timer once it has moved to E-UTRAN (i.e. it has connected to the E-UTRAN). This can be done via the following three alternative implementations:
the UE ignores the ready timer after initiation of an intersystem change, or
the UE stops Ready timer when moving to E-UTRAN, or
the UE stops Ready timer when moving from E-UTRAN to GERAN.
In case the UE ignores the ready timer after intersystem change, the UE may ignore the expiry/termination/stopping of the Ready timer. In addition, the UE may ignore the ready timer prior to, and until, its expiration.

Optionally, the network (SGSN) can ignore its own Ready timer. In case the UE stops Ready timer the usual behaviour would apply, i.e. the UE would start again the periodic routing area update timer T3312.

Secondly, the SGSN stops Ready timer associated with the UE when the SGSN knows the UE has moved to E-UTRAN (LTE), i.e. when the SGSN receives a Context Request from the MME (this occurring when ISR has not been activated while the UE was in GERAN).

When the SGSN stops the Ready timer the usual behaviour would apply, i.e. the SGSN would start again the mobile reachable timer (see TS 23.060). Then, as per TS 23.060 subclause 8.1.3a, if PDP Contexts associated with the UE are to be preserved, the SGSN shall send a Release Access Bearers Request to the serving gateway (S GW) to remove the SGSN address for user plane and downlink S4 GTP-U TEID.

Figure 4:
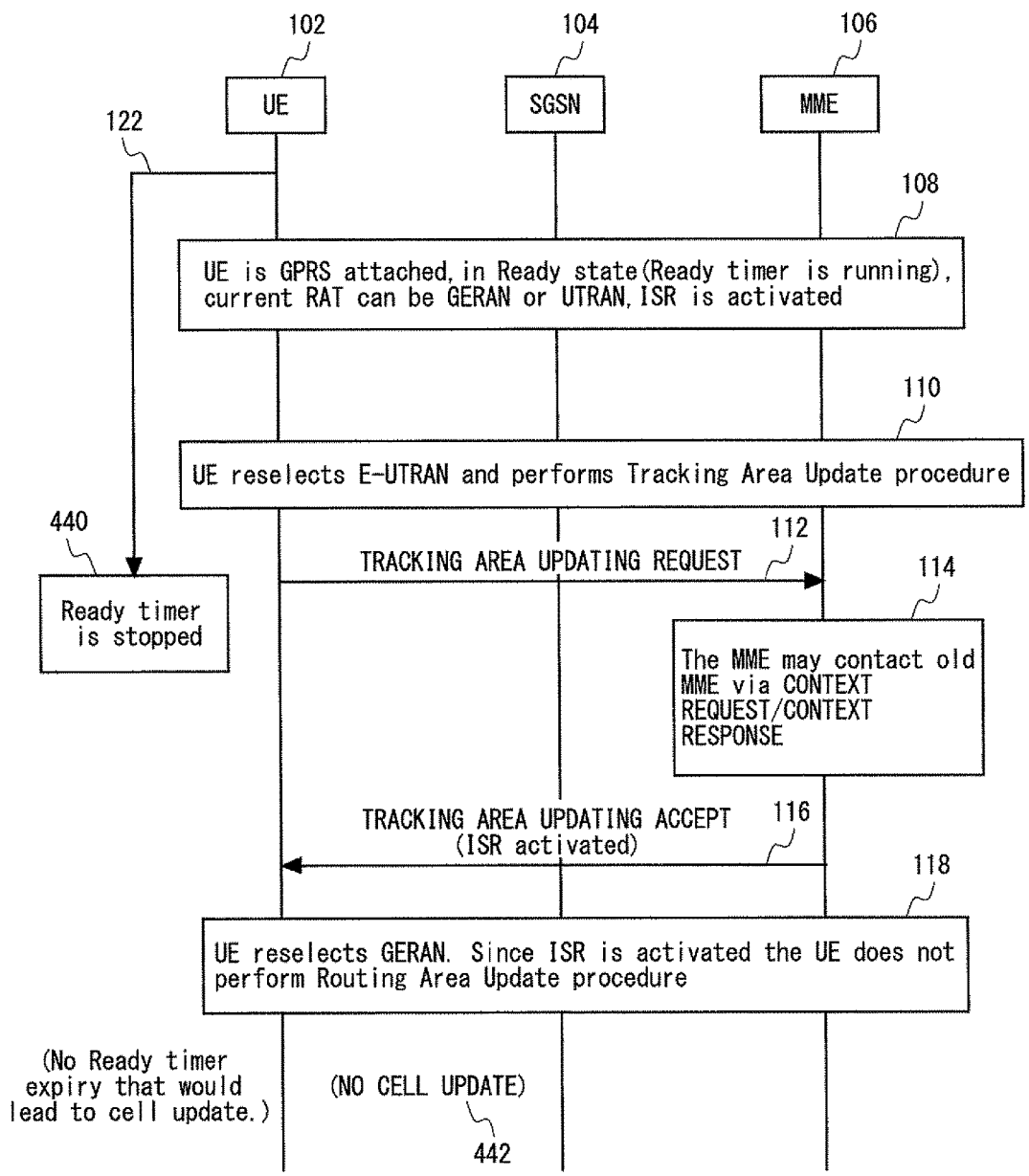
FIG. 4 is an event diagram showing proposed new methods for performing E-UTRAN to GERAN intersystem change while Ready timer is running and ISR is activated when the UE reselects GERAN.

FIG. 4 is an event diagram showing a proposed new method for performing E-UTRAN to GERAN intersystem change while Ready timer is running and ISR is activated when the UE reselects GERAN, when ISR has been previously activated while the UE was in GERAN. The Ready timer is stopped (box 440) in response to the UE selecting E-UTRAN (box 110).

Figure 5:
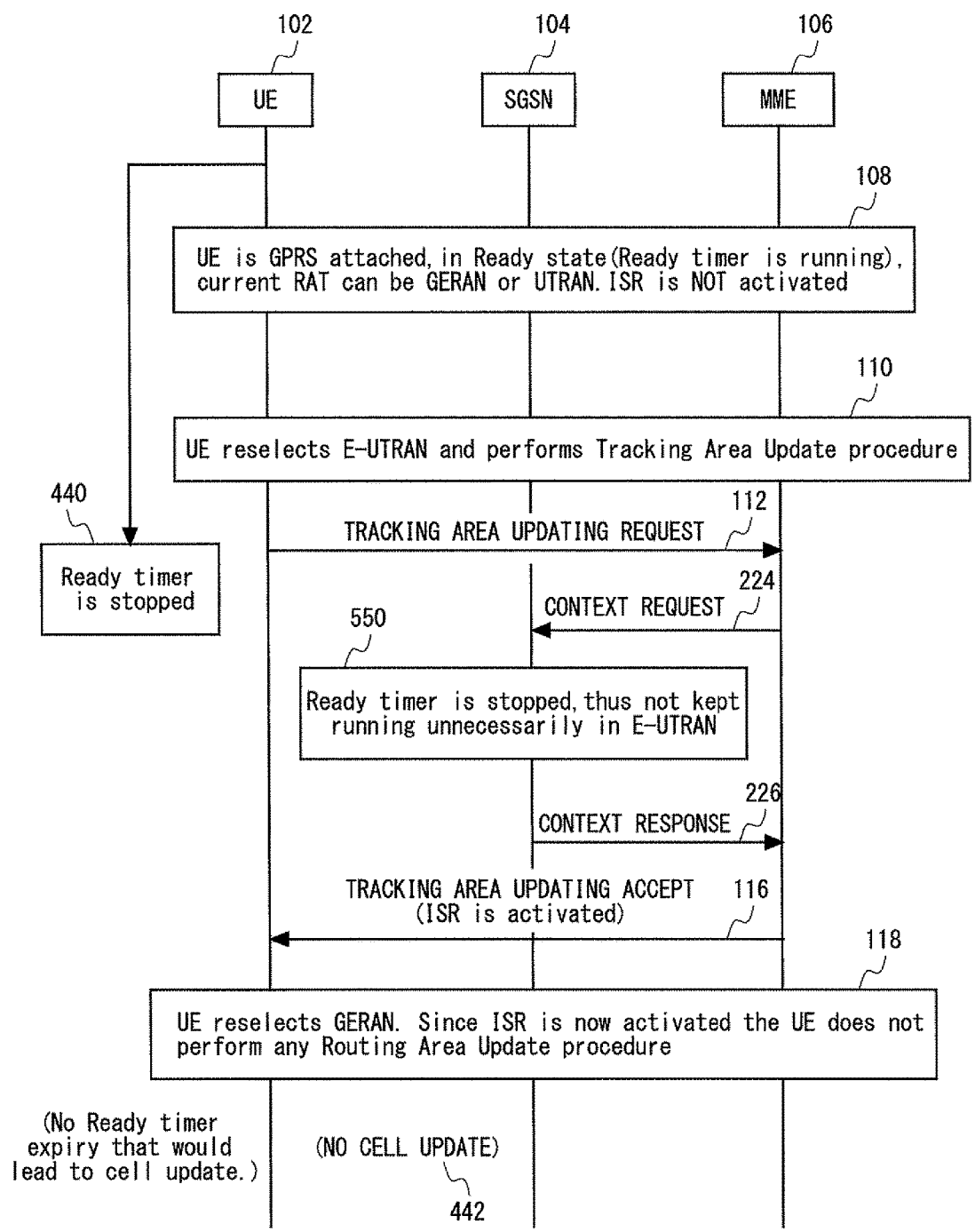
FIG. 5 is an event diagram showing proposed new methods for performing E-UTRAN to GERAN intersystem change while Ready timer is running and ISR is activated when the UE reselects GERAN.

FIG. 5 is another event diagram showing a proposed new method for performing E-UTRAN to GERAN intersystem change. This method is carried out while Ready timer is running and ISR is activated, when the UE reselects GERAN, by means of the tracking area updating accept message 116, when ISR has not been previously activated while the UE was previously in GERAN (box 109). As in FIG. 4, The Ready timer is stopped (box 440) in response to the UE selecting E-UTRAN (box 110). The timer may be stopped in response to the sending of the tracking area update (112). Alternatively or in addition, as shown by box 550, the SGSN 104 may stop its own Ready timer in response to its receiving a CONTEXT REQUEST 224 sent by the MME 106. Because there is no expiry of the Ready timer in the wireless terminal or the SGSN, no Cell Update is performed (442).

Figure 6:
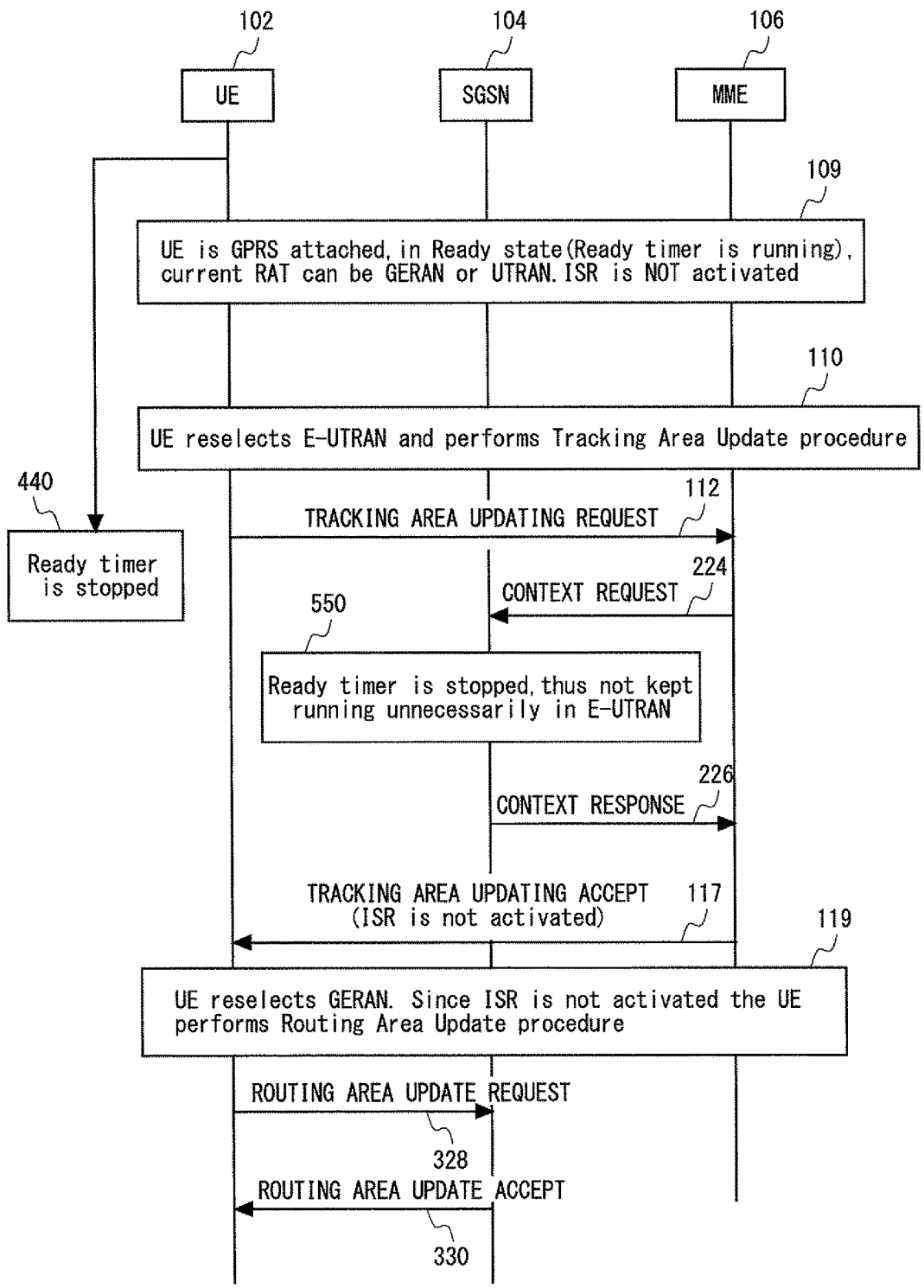
FIG. 6 is an event diagram showing a proposed new method for performing E-UTRAN to GERAN intersystem change while Ready timer is running and ISR is not activated when the UE reselects GERAN.

FIG. 6 is another event diagram showing a proposed new method for performing E-UTRAN to GERAN intersystem change. This method is carried out while Ready timer is running and ISR is not activated (117). When the UE re-selects GERAN (box 119), because ISR is not activated, the UE performs a RAU procedure by sending a RAU REQUEST message 328, and the SGSN responds by sending a RAU ACCEPT message 330.

Figure 7:
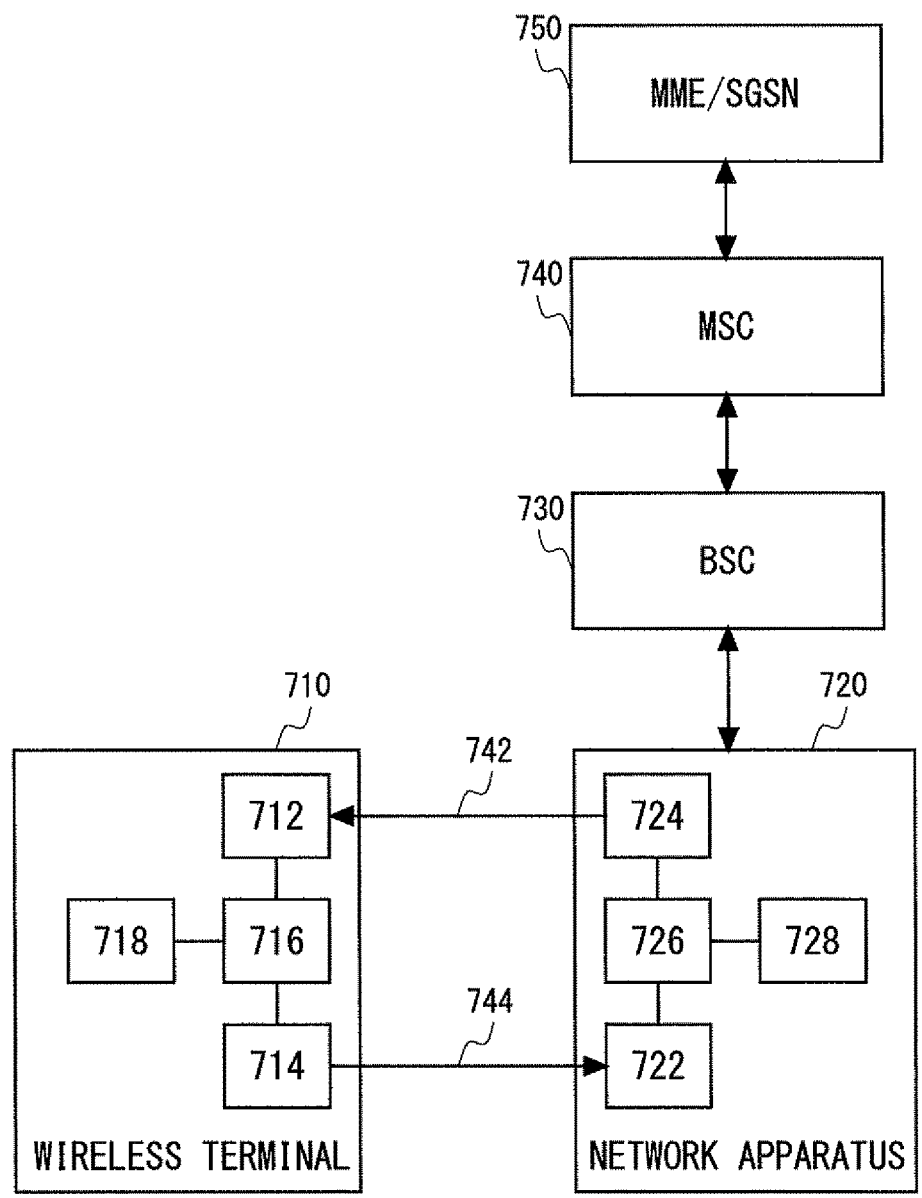
FIG. 7 shows a wireless terminal and network apparatus arranged for operating according to the invention.

FIG. 7 shows a wireless terminal 710 comprising a receiver 712, a transmitter 714, a processor 716 coupled to the receiver 712 and to the transmitter 714, and a memory 718 coupled to the processor 716. The processor 716 is configured to control the receiver 712 and the transmitter 714 according to instructions contained in the memory 718.

The receiver 712 of the wireless terminal 710 is arranged for receiving, via a wireless link 742 between the wireless terminal and the network apparatus, signalling data and/or traffic/media data transmitted by a network apparatus 720. The transmitter 714 of the wireless terminal 710 is arranged for transmitting signalling data and/or traffic/media data via a wireless communication link 744 between the wireless terminal and the network apparatus and is preferably arranged for performing transmission of information intended for one or more other network apparatus (not shown) via one or more other wireless links (not shown).

The communications link 742 used by the receiver 712 of the wireless terminal 710 and the communication link 744 used by the transmitter 714 of the wireless terminal 710 can be considered as the same communication link. Alternatively, the wireless communication link 742 used by the receiver 712 of the wireless terminal 710 can be considered as one link and the wireless communication link 744 used by the transmitter 714 of the wireless terminal 710 can be considered as another communication link. For example, the link 742 used by the receiver 712 can be considered as a down link and the link 744 used by the transmitter 714 can be considered as an uplink. Such use of communication links for transmitting and receiving signals are well known in the art and need not be discussed further.

The network apparatus 720 comprises a receiver 722, a transmitter 724, a processor 726, and a memory 728. The functions of the receiver 722, transmitter 724, processor 726 and memory 728 of the network apparatus 720 are similar to the respective functions of the receiver 712, transmitter 714, processor 716 and memory 718 of the wireless terminal 710. In use, the network apparatus 720 wirelessly transmits, via its transmitter 724 and wireless link 742, signals that are intended for the receiver 712 of the wireless terminal 710. Similarly the transmitter of wireless terminal 710 transmits one or more signals wirelessly that are intended for the network apparatus 720 via transmitter 714 and wireless link 744.

Preferably the receiver 712 of the wireless terminal 710 can receive signals transmitted by one or more further network apparatus (not shown). Similarly, preferably the transmitter 714 of the wireless terminal 710 can transmit signals intended for one or more further network apparatus (not shown).

Preferably the receiver 222 of the network apparatus 720 can receive signals transmitted by one or more further wireless terminals (not shown). Similarly, preferably the transmitter 724 of the network apparatus 720 can transmit signals intended for one or more further wireless terminal(s) (not shown).

In this example the network apparatus 720 forms part of a base station of a cellular communications network and the wireless terminal 710 is a cellular wireless terminal. However, it should be understood there may exist only two devices, illustrated as the wireless terminal 710 and the network apparatus 720 in FIG. 3. A wireless communication system comprising only two such devices or a small number of devices can benefit from the claimed features.

A base station controller (BSC) 730, coupled to the network apparatus 720, is arranged to route signals to/from the network apparatus 720 and to/from other such network apparatus (not shown). A mobile switching centre (MSC) 740 is arranged to route signals to/from the base station controller 730 and to/from other such base station controllers (not shown). A MME or SGSN 750 (depending on whether the network is E-UTRAN or UTRAN/GERAN) is arranged to control and route signals to/from the mobile switching centre 740 and to/from a public switched telephone network (PSTN) (not shown). The principles of operation of the base station controller 730, mobile switching centre 740 and MME or SGSN 750 are well known and need not be described further.

The above-described embodiments are applicable to E-UTRAN (as the second network) and UTRAN/GERAN (as the first network, where the Activate PDP context request message of GERAN is an equivalent of the PDN connectivity request message of E-UTRAN). Clearly, the embodiments can be applied, with minor simple modification as required, to other RAN technologies.

As can be seen from FIG. 4, the UE will not perform unnecessary cell updates when ISR is activated. Otherwise the benefits from ISR would be lost.

As can be seen from FIG. 6, the UE will not maintain any Ready timer unnecessarily when ISR is not activated. Indeed, when ISR is not activated the UE will perform RAU at intersystem change from E-UTRAN to GERAN.

On the network side, the network does not need to maintain Ready timer for the UE if the UE has moved to E-UTRAN, which the network knows since the UE will always perform a TAU when moving from GERAN to E-UTRAN, if Ready timer is running in the UE, as per the following requirement reproduced from 3GPP TS 24.301 release 11.2.1, subclause 5.5.3.2.2:

"The UE in state EMM-REGISTERED shall initiate the tracking area updating procedure by sending a TRACKING AREA UPDATE REQUEST message to the MME, [ . . . ]

1) when the UE reselects an E-UTRAN cell while it was in GPRS READY state or PMM-CONNECTED mode;"

which is also described in 3GPP TS 23.401, version 11.1.0, subclause 5.3.3.0, a portion of which is reproduced below:

"A standalone tracking area update (with or without S GW change, described in clauses 5.3.3.1 and 5.3.3.2 respectively) occurs when a GPRS-attached or E UTRAN-attached UE experiences any of the following conditions:

UE detects it has entered a new TA that is not in the list of TAIs that the UE registered with the network (except for the case of a UE configured to perform Attach with IMSI when entering a TA in a new non-equivalent PLMN in RRC-IDLE mode);

the periodic TA update timer has expired;

UE was in UTRAN PMM_Connected state (e.g. URA_PCH) when it reselects to E UTRAN;

UE was in GPRS READY state when it reselects to E UTRAN;"

It follows that, as depicted on FIG. 6, the SGSN can stop its Ready timer for the UE once the SGSN receives a Context Request message from the MME.

The above-described embodiments provide that, in a UE supporting GPRS and LTE, the Ready timer is rendered ineffective by being stopped:

at intersystem change from GERAN to E-UTRAN (GPRS to LTE), or at intersystem change from E-UTRAN to GERAN (LTE to GPRS).

According to another variant, the UE would ignore the Ready timer after intersystem change from LTE to GPRS, thus rendering the Ready timer ineffective. Clearly, according to each embodiment, the Ready timer is rendered ineffective.

Preferably, in an SGSN, the Ready timer is stopped or ignored by the SGSN when the SGSN receives the indication that the UE performs TAU. That is, when the SGSN receives the tracking area updating request, or the context request (following a tracking area updating request from the UE to the MME). Again in this case, the Ready timer is rendered ineffective.

As can be seen in the excerpts below from 3GPP TS 24.008, currently according to the state of the art, the only condition to stop Ready timer, on both the UE side and the network side, is the indication of "Forced to Standby".

3GPP TS 24.008, section 11.2.2, Table 11.3a (GPRS Mobility management timers—MS side), fourth row, indicates in relation to the T3314 READY timer (A/Gb mode only):

Default timer value is 44 seconds, for all states except GMM-DEREG. Cause of start of timer is transmission of a PTP PDU. The normal stop is "Forced to Standby". On expiry of the T3314 timer, no cell-updates are performed.

Note 2: The default value of this timer is used if neither the MS nor the Network send another value, or if the Network sends this value, in a signalling procedure.

3GPP TS 24.008, section 11.2.2, Table 11.4a (GPRS Mobility management timers—network side), third row, states that:

T3314 READY timer (A/Gb mode only) value is "Default 44 seconds for all STATEs except GMM-DEREG. Cause of start of timer T3314 is "Receipt of a PTP PDU". The normal stop is "Forced to Standby". On expiry of the T3314 timer, the "network shall page the MS if a PTP PDU has to be sent to the MS."

Note 2: The default value of this timer is used if neither the wireless terminal (UE) nor the Network send another value, or if the Network sends this value, in a signalling procedure. The value of this timer should be slightly shorter in the network than in the wireless terminal (UE), this is a network implementation issue.

It follows that rendering the Ready timer ineffective at a system change between GERAN and E-UTRAN therefore represents a novel feature that overcomes an unforeseen problem.

Figure 1:
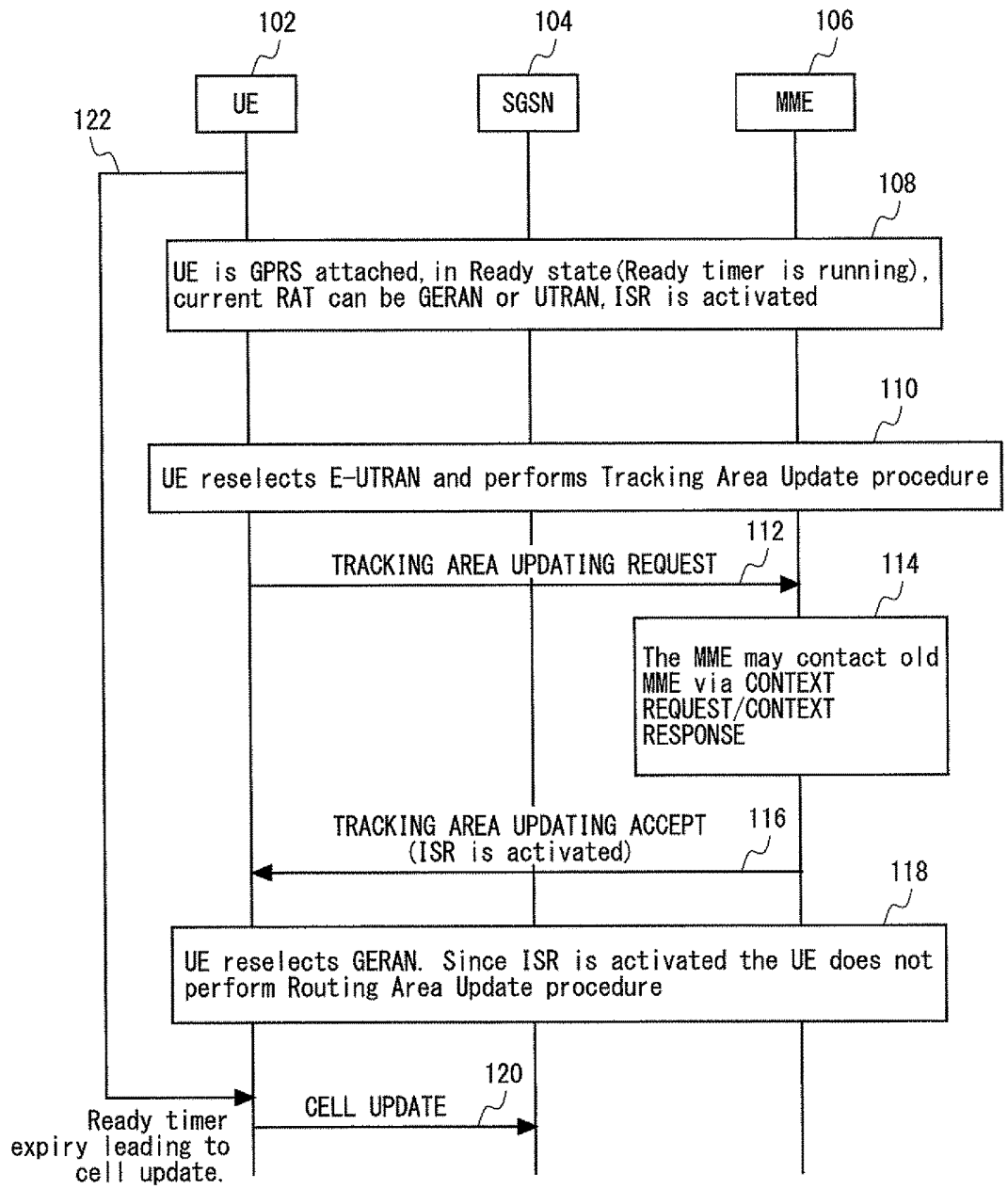
FIG. 1 illustrate a known procedure for performing an E-UTRAN-to-GERAN intersystem change while Ready timer is running and ISR is activated when the UE reselects GERAN.
Figure 2:
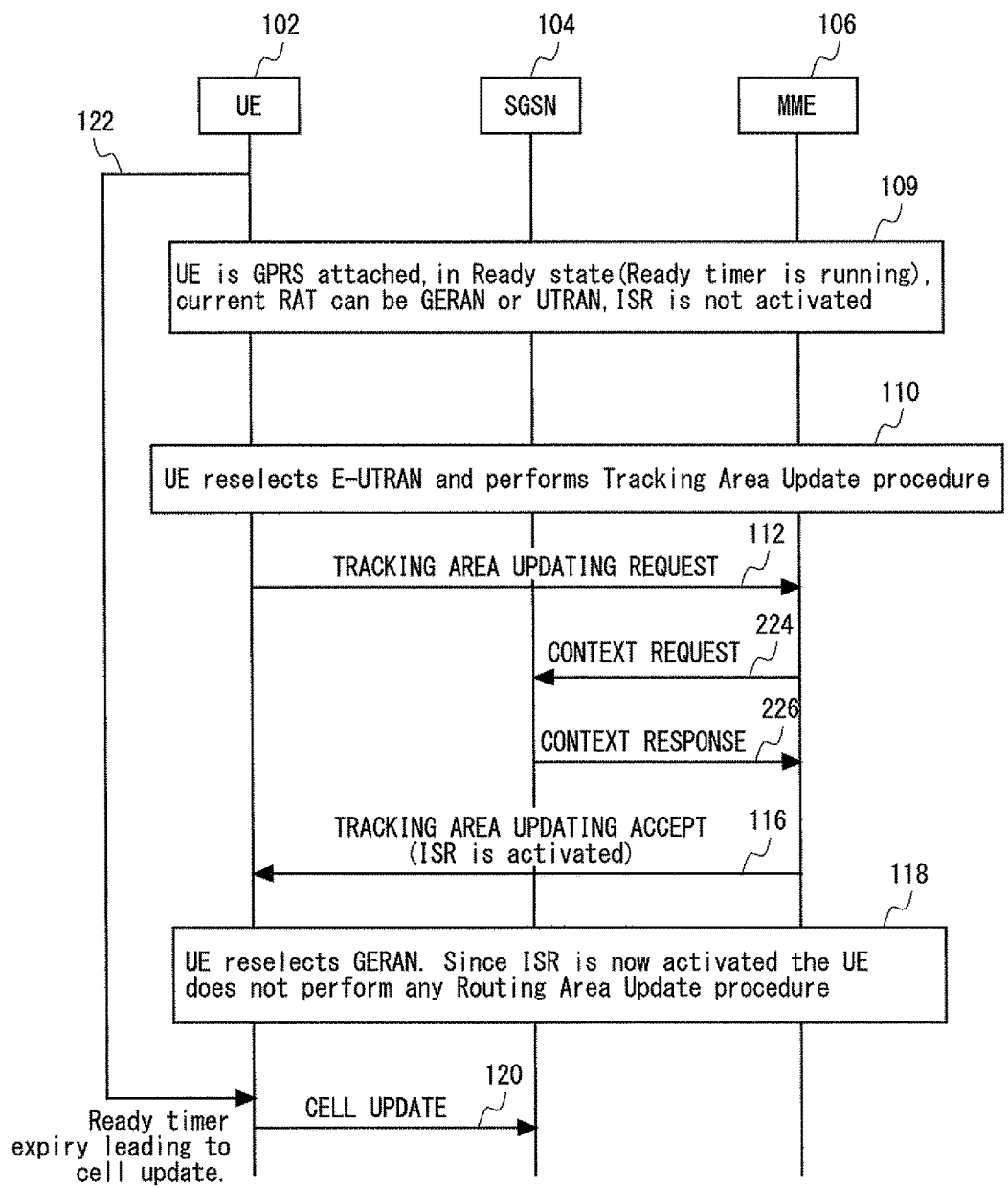
FIG. 2 illustrate a known procedure for performing an E-UTRAN-to-GERAN intersystem change while Ready timer is running and ISR is activated when the UE reselects GERAN.
Figure 3:
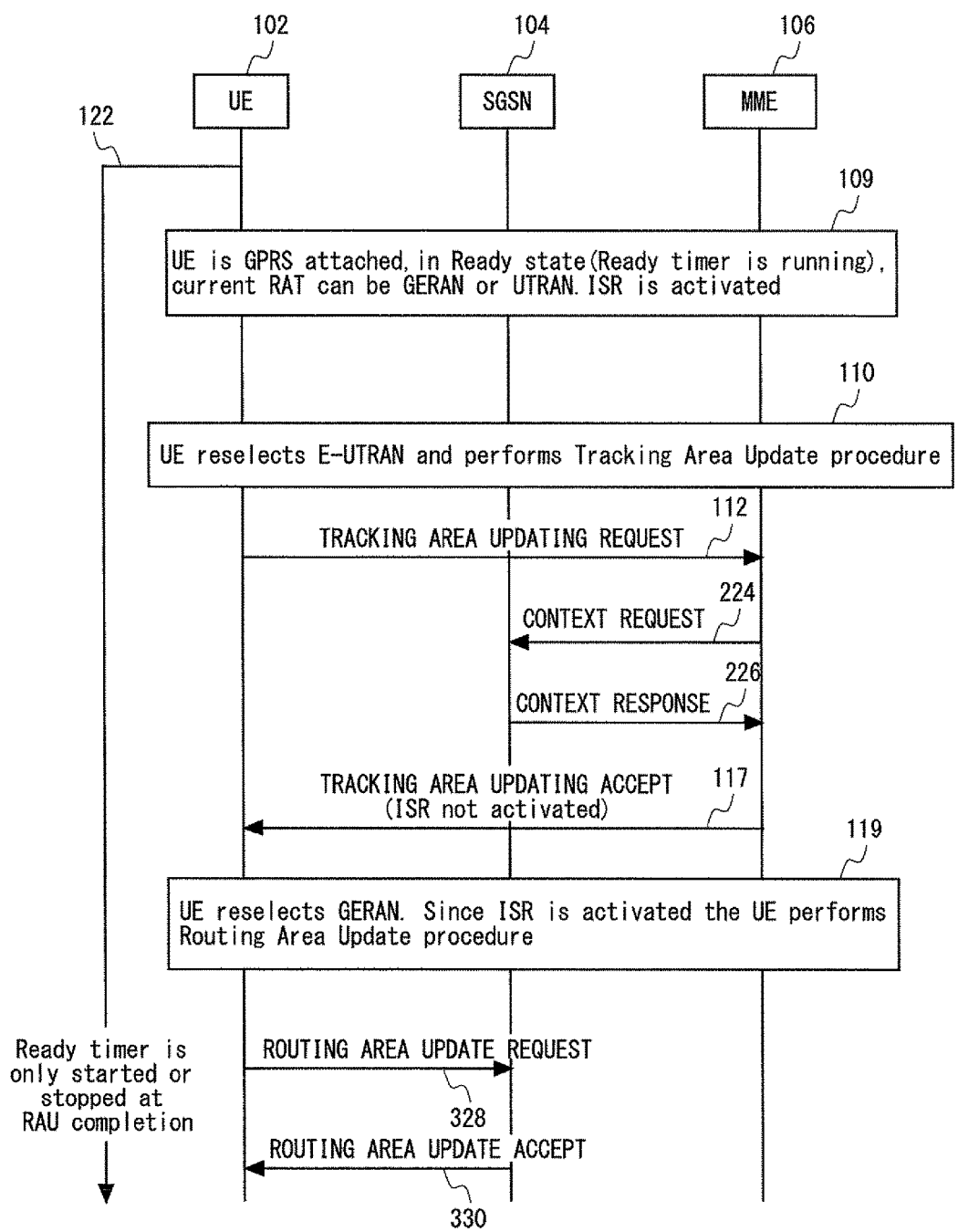
FIG. 3 illustrates a known procedure for performing an E-UTRAN-to-GERAN intersystem change while Ready timer is running and ISR is not activated when the UE reselects GERAN.

In the accompanying drawings, FIGS. 1-3 illustrate operation of a wireless terminal according to known methods and FIGS. 4-6 illustrate novel operation of a wireless terminal and a network apparatus according to inventive features described herein. FIG. 7 applies to known methods and the inventive features.

This software can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

Various other modifications will be apparent to those skilled in the art and will not be described in further detail here.

As mentioned above, although the present invention is explained with reference to the illustrative embodiment, the present invention is not limited by the above. Various modifications understood by a person skilled in the art can be made within the scope of the invention.

This application is based upon and claims the benefit of priority from United Kingdom patent application No.1206790.6 filed on 18 Apr. 2012, the disclosure of which is incorporated herein in its entirety by reference.

INDUSTRIAL APPLICABILITY

The present invention relates to a wireless terminal and method of operating, and in particular to intersystem change between E-UTRAN (also known as LTE) and GERAN.

REFERENCE SIGNS LIST

102 UE
104 SGSN
106 MME
710 wireless terminal
712 receiver
714 transmitter
716 processor
718 memory
720 network apparatus
722 receiver
724 transmitter
726 processor
728 memory
730 BSC
740 MSC
742 wireless link
744 wireless link
750 MME/SGSN

The invention claimed is:

1. A mobile station for communicating with a first system which operates in a first mode and for communicating with a second system which operates in a second mode, different to said first mode, the mobile station comprising:
   at least one memory storing instructions, and
   at least one processor configured to execute the instructions to:
   perform an attachment to the first system and to start a General Packet Radio Service (GPRS) Mobility Management (GMM) ready timer on transmission of a Protocol Data Unit (PDU) by the mobile station;
   initiate a tracking area update procedure at an intersystem change from the first mode to the second mode, and
   stop the GMM ready timer in response to the tracking area update procedure.

2. The mobile station according to claim 1, wherein the first mode comprises an A/Gb mode.

3. The mobile station according to claim 1, wherein the first system comprises a GSM/EDGE Radio Access Network (GERAN), and
   wherein the second system comprises an Evolved Universal Terrestrial Radio Access Network (E-UTRAN).

4. A method for controlling a mobile station, the mobile station being for communicating with a first system which operates in a first mode and for communicating with a second system which operates in a second mode, different to said first mode, the method comprising:
   performing an attachment to the first system;
   starting a General Packet Radio Service (GPRS) Mobility Management (GMM) ready timer on transmission of a Protocol Data Unit (PDU) by the mobile station;
   initiating a tracking area update procedure at an intersystem change from the first mode to the second mode; and
   stopping the GMM ready timer in response to the tracking area update procedure.

5. The method according to claim 4, wherein the first mode comprises an A/Gb mode.

6. The method according to claim 4, wherein the first system comprises a GSM/EDGE Radio Access Network (GERAN), and
wherein the second system comprises an Evolved Universal Terrestrial Radio Access Network (E-UTRAN).

7. A non-transitory computer readable medium storing a program that causes a mobile station, the mobile station being for communicating with a first system which operates in a first mode and for communicating with a second system which operates in a second mode, different to said first mode, to execute a process comprising:
performing an attachment to the first system;
starting a General Packet Radio Service (GPRS) Mobility Management (GMM) ready timer on transmission of a Protocol Data Unit (PDU) by the mobile station;
initiating a tracking area update procedure at an inter-system change from the first mode to the second mode; and
stopping the GMM ready timer in response to the tracking area update procedure.

8. The non-transitory computer readable medium according to claim 7, wherein the first mode comprises an A/Gb mode.

9. The non-transitory computer readable medium according to claim 7, wherein the first system comprises a GSM/EDGE Radio Access Network (GERAN), and
wherein the second system comprises an Evolved Universal Terrestrial Radio Access Network (E-UTRAN).

* * * * *